United States Patent
Dutey et al.

(10) Patent No.: US 8,923,408 B2
(45) Date of Patent: Dec. 30, 2014

(54) SYSTEMS FOR TRANSCODING SUB-PICTURE DATA AND METHODS OF OPERATING THE SAME

(75) Inventors: Denis Dutey, Jarrie (FR); Nikola Cornij, Karlsruhe (DE)

(73) Assignee: STMicroelectronics SA, Montrouge (FR)

( * ) Notice: Subject to any disclaimer, the term of this patent is extended or adjusted under 35 U.S.C. 154(b) by 3404 days.

(21) Appl. No.: 10/702,220

(22) Filed: Nov. 5, 2003

(65) Prior Publication Data
US 2004/0146111 A1    Jul. 29, 2004

(30) Foreign Application Priority Data
Nov. 5, 2002   (EP) ................................. 02292752

(51) Int. Cl.
| | |
|---|---|
| *H04N 7/12* | (2006.01) |
| *H04N 11/02* | (2006.01) |
| *H04N 11/04* | (2006.01) |
| *H04N 21/258* | (2011.01) |

(Continued)

(52) U.S. Cl.
CPC ..... *H04N 21/2662* (2013.01); *H04N 21/25808* (2013.01); *H04N 19/00078* (2013.01); *H04N 19/00266* (2013.01); *H04N 19/00206* (2013.01); *H04N 19/00545* (2013.01); *H04N 5/85* (2013.01); *H04N 19/00048* (2013.01); *H04N 5/45* (2013.01); *H04N 7/012* (2013.01); *H04N 9/8042* (2013.01); *H04N 21/4884* (2013.01); *H04N 9/8227* (2013.01); *H04N 19/00472* (2013.01); *H04N 5/4401* (2013.01)
USPC ............. 375/240.25; 375/240.01; 375/240.02

(58) Field of Classification Search
USPC ............ 375/240.25–240.27; 345/204; 386/95
See application file for complete search history.

(56) References Cited

U.S. PATENT DOCUMENTS

| 4,451,848 | A | 5/1984 | Okada et al. |
| 6,233,021 | B1 * | 5/2001 | Winter ......................... 348/578 |

(Continued)

FOREIGN PATENT DOCUMENTS

| EP | 1032217 | 8/2000 |
| WO | WO 98/17057 | 4/1998 |
| WO | WO 99/38314 | 7/1999 |

OTHER PUBLICATIONS

Engdahl, T.; "How to Show Video Material in Computer Screen"; 'Online!; Nov. 5, 1999; pp. 1-6; XP002241026.
Taylor, J.; "DVD Demystified"; Dec. 2000; McGraw-Hill; New York; XP002241009; pp. 138-142.

(Continued)

*Primary Examiner* — Chikaodili Anyikire
(74) *Attorney, Agent, or Firm* — Allen, Dyer, Doppelt, Milbrath & Gilchrist, P.A.

(57) ABSTRACT

A method of transcoding a sub-picture unit each comprising encoded sub-picture pixel data including sub-picture lines separated into at least a first field and a second field as well as a set of display control commands associated with the sub-picture pixel data, comprises the step of pre-processing (53) the display control commands to prepare transcoding to frame format. Encoded lines of said top and bottom fields are then merged (56,73) into a single encoded frame and the display control commands are modified (56,74) according to changes in encoded sub-picture pixel data before outputting.

21 Claims, 15 Drawing Sheets

| SPUH | PXD-M | SP_DCSQT-M |
|---|---|---|
| | top field and bottom field merged into frame | |

(51) Int. Cl.
*H04N 19/12* (2014.01)
*H04N 21/2662* (2011.01)
*H04N 19/172* (2014.01)
*H04N 19/156* (2014.01)
*H04N 19/46* (2014.01)
*H04N 19/112* (2014.01)
*H04N 5/45* (2011.01)
*H04N 7/01* (2006.01)
*H04N 9/82* (2006.01)
*H04N 19/40* (2014.01)
*H04N 5/44* (2011.01)
*H04N 5/85* (2006.01)
*H04N 9/804* (2006.01)
*H04N 21/488* (2011.01)

(56) References Cited

U.S. PATENT DOCUMENTS

| | | | |
|---|---|---|---|
| 6,259,858 B1 * | 7/2001 | Ando et al. | 386/95 |
| 6,441,813 B1 * | 8/2002 | Ishibashi | 345/213 |
| 6,621,866 B1 * | 9/2003 | Florencio et al. | 375/240.25 |
| 6,925,250 B1 * | 8/2005 | Oshima et al. | 386/111 |
| 6,993,249 B1 * | 1/2006 | Wiinter et al. | 386/95 |
| 2002/0006271 A1 * | 1/2002 | Winter et al. | 386/95 |
| 2002/0152317 A1 | 10/2002 | Wang et al. | |
| 2003/0043142 A1 * | 3/2003 | Ishibashi | 345/213 |
| 2003/0193486 A1 * | 10/2003 | Estrop | 345/204 |

OTHER PUBLICATIONS

Taylor J.; "DVD Demystified"; Dec. 2000; McGraw-Hill; New York XP002241010; pp. 309-311.

* cited by examiner

PRIOR ART  FIG. 1
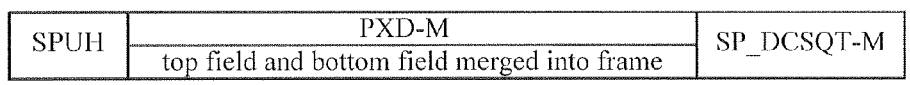
FIG. 2
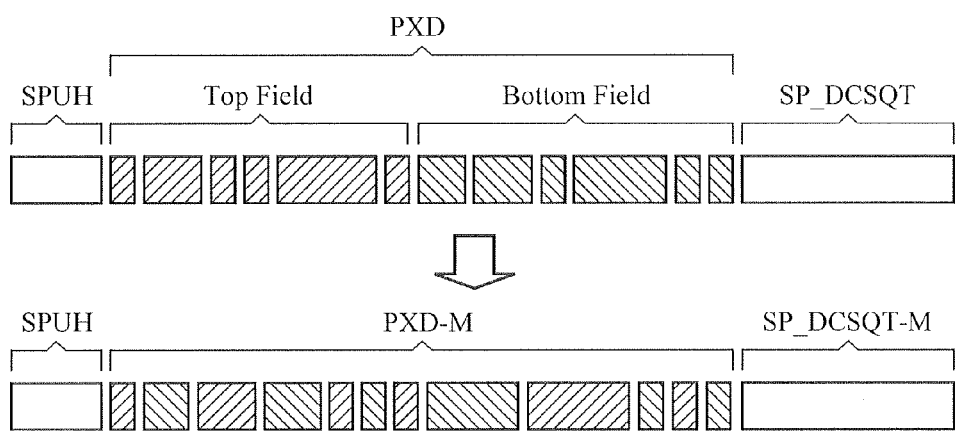
FIG. 3
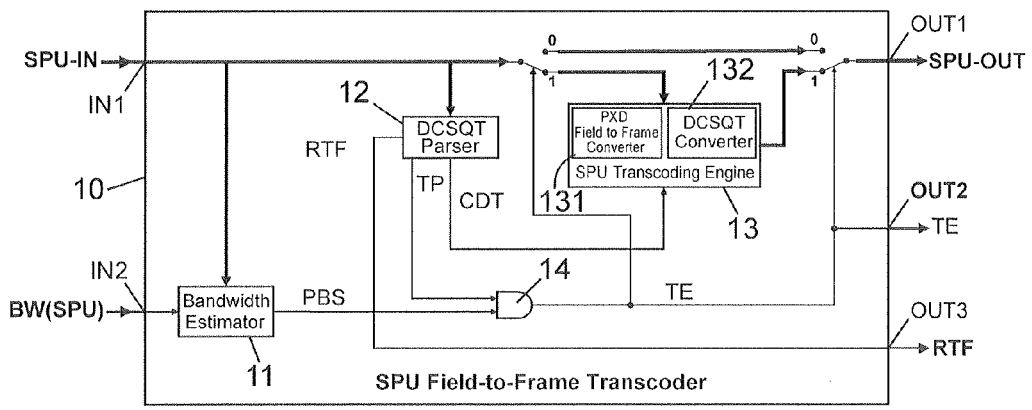
FIG. 4

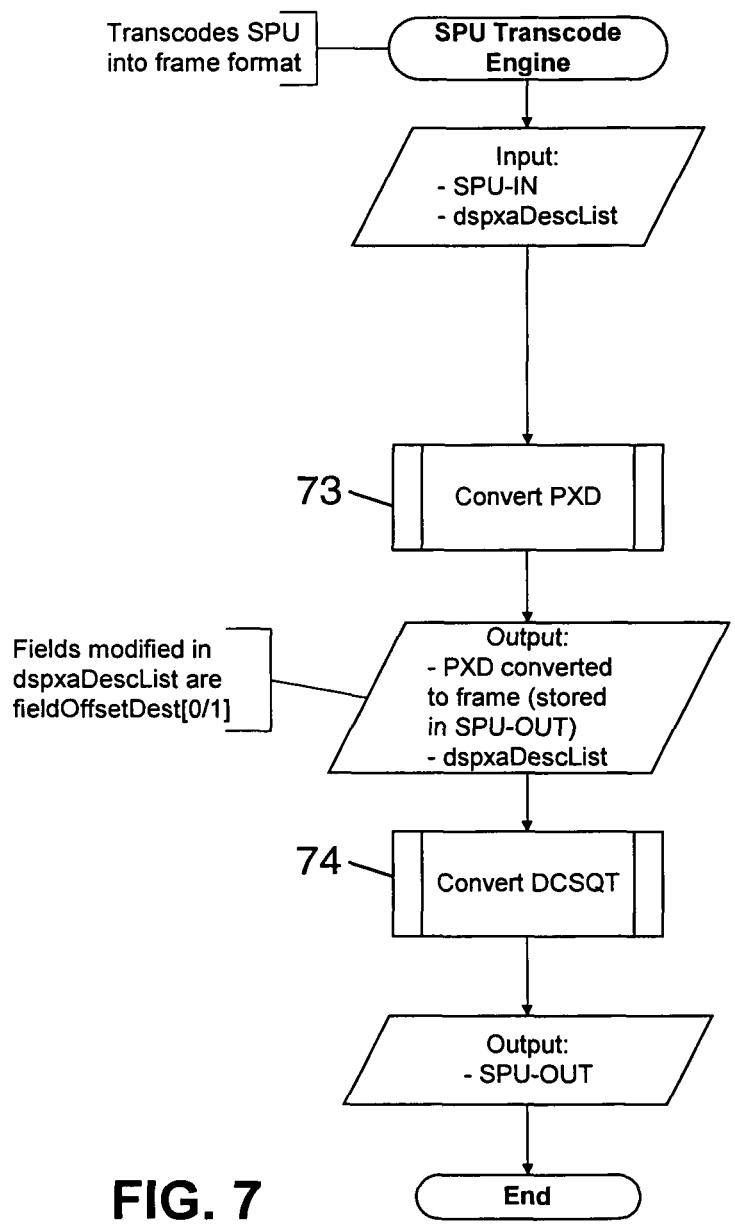

SYSTEMS FOR TRANSCODING SUB-PICTURE DATA AND METHODS OF OPERATING THE SAME

TECHNICAL FIELD OF THE INVENTION

The present invention relates generally to digital video technologies, and, more particularly, to systems for transcoding sub-picture data, such as data available on a digital record carrier such as a Digital Versatile Disc ("DVD," or Digital Video Disc), and to methods of operating the same.

BACKGROUND OF THE INVENTION

According to the DVD standard ("DVD Specifications for Read-Only Disc, version 1.0"), it is provided that sub-picture data, mainly subtitles or DVD menu highlights, might be recorded on certain area(s) of the DVD. During playback of the DVD, said sub-picture data is decoded and displayed combined with decoded video data.

Sub-picture information is arranged in data units called Sub-Picture Units (SPUs). Sub-picture data is defined in DVD standard with interlaced display device in mind. Interlaced display is a type of video display in which one image is displayed in two successive sweeps by the electron beam. Odd lines (1, 3, 5, . . . ) are displayed first, followed by even lines (2, 4, 6, . . . ). Data corresponding to odd and even lines is known as top field and bottom field respectively. Moreover, the DVD standard specifies sub-picture data in such a way as to be easily decoded and displayed "on the fly", that is to say without buffering into external frame buffer memories. This is the reason why top and bottom fields of a whole video frame are encoded separately inside a SPU (top field being recorded first) a frame designating data corresponding to a full image to be displayed on the screen. This feature of the SPU structure is referred to as "Field format" in the following.

Sub-picture decoder circuits which are readily available on the market are designed in accordance with the sub-picture data having the afore-mentioned field format. They are optimised to process (decode and display) field-based SPUs.

If, however, sub-picture data is to be displayed on a progressive display device, for instance a progressive TV, top and bottom fields have to be combined in one frame at some point before displaying it. It is recalled that progressive display is another type of video display in which all lines of one image (1, 2, 3, . . . ) are displayed sequentially over a single sweep, as opposed to interlaced display (see above).

The first solution coming in mind is to redesign a specific hardware for the sub-picture decoder circuit, so that the latter have a progressive output capability. Such solution is however cumbersome.

SUMMARY OF THE INVENTION

To address the above-discussed deficiencies of the prior art, an object of the present invention is to propose a method and an apparatus to allow for decoding and displaying field-based sub-picture data on a progressive display device whereby heavy development of a new sub-picture decoder circuit is avoided.

The invention thus proposes a method of transcoding a sub-picture unit each comprising encoded sub-picture pixel data and a set of display control commands associated with the sub-picture pixel data, comprising the steps of:
inputting sub-picture units in which encoded sub-picture pixel data comprises sub-picture lines separated into at least a first field and a second field;
pre-processing said display control commands to prepare transcoding to frame format;
merging encoded lines of said first and second fields into a single encoded frame;
modifying said display control commands according to changes in encoded sub-picture pixel data;
outputting sub-picture unit with transcoded sub-picture pixel data and modified display control commands.

A second aspect of the invention relates to an apparatus for transcoding a sub-picture unit each comprising encoded sub-picture pixel data and a set of display control commands associated with the sub-picture pixel data, comprising:
means for inputting sub-picture units in which encoded sub-picture pixel data comprises sub-picture lines separated into at least a first field and a second field;
means for pre-processing said display control commands to prepare transcoding to frame format;
means for merging encoded lines of said first and second fields into a single encoded frame;
means for modifying said display control commands according to changes in encoded sub-picture pixel data;
means for outputting sub-picture unit with transcoded sub-picture pixel data and modified display control commands.

A third aspect of the invention relates to a sub-picture decoder circuit comprising an apparatus for transcoding according to the second aspect arranged for receiving as an input a stream of sub-picture units each comprising encoded sub-picture pixel data and a set of display control commands associated with the sub-picture pixel data and for delivering as an output a stream of frame-transcoded or unmodified sub-picture units, and further comprising means for decoding and displaying said frame-transcoded or unmodified sub-picture units.

A fourth aspect of the invention relates to a video display system comprising a source of sub-picture data in the form of a stream of sub-picture units each comprising encoded sub-picture pixel data and a set of display control commands associated with the sub-picture pixel data, a field-based sub-picture decoder circuit having means for decoding and displaying said encoded sub-picture pixel data based on said display control commands, and an apparatus for transcoding according to the second aspect. The apparatus is arranged for receiving as an input said stream of sub-picture units and for delivering as an output a stream of frame-transcoded or unmodified sub-picture units to said means for decoding and displaying.

The objective of the field-to-frame transcoding process according to the invention is to accept field-based SPU as an input, and to interleave top and bottom fields before the SPU is submitted to a conventional SPU decoder circuit for decoding and display. The decoder circuit is thus fed with this new stream of transcoded (frame-based) PDUs as if it was a stream of field-based PDUs with twice more lines.

As will be appreciated, the hardware design of existing sub-picture decoder circuits is thus to be modified to a very limited extent, first to increase by one the number of bits of the lines counter and secondly to add a one-line memory, a line-doubling module and a bottom field shift module to make the decoder capable to handle the cases where transcoding is not possible.

According to a further advantage, sub-picture data is processed while in compressed form, which has multiple benefits: lower processing power required, less accesses to system memory, lower memory size requirements, . . . .

According to an embodiment, it is also determined whether transcoding of incoming SPU is possible or not (since processor bandwith and SPU data structure could be limiting factors). If transcoding is possible, SPU Transcoder will produce frame-transcoded SPU by interleaving top field and bottom field lines into a frame. Else, SPU is left as it is (i.e., unmodified) and the transcoder produces an information for signalling the sub-picture decoder circuit accordingly. Based on this information, the decoder will enter a so called "Line Doubling" mode.

Line Doubling mode is a mode of operation allowing the sub-picture decoder to produce progressive frame output using one field as an input. In general, when one single field from interlaced material is to be displayed on progressive display device, missing lines have to be interpolated. This is because fields have either odd lines 1, 3, 5 . . . N−1 or even lines 2, 4, 6, . . . N, while progressive display device expects whole frame at once, that is all lines 1, 2, 3, 4, . . . N (N being total number of lines in a frame).

The simplest and most cost effective way to interpolate lines is to repeat them. This is the Line Doubling mode. In this mode, every line of a field is repeated once, which results in an output image that has twice as many lines as the input image. For example, when displaying top field in Line Doubling mode, the sub-picture decoder receives at the input odd lines 1, 3, 5, . . . N−1 and delivers at the output lines 1, 1, 3, 3, 5, 5, . . . N−1, N−1.

Because top and bottom fields have different positions on the screen (bottom field is one line below top field), when bottom field is displayed in Line Doubling mode, resulting output frame has to be moved one line down to account for difference in position between top and bottom field. This is referred to as "Bottom Field Shift".

When displaying a field in Line Doubling mode, half of information is missing (all the lines from other field). With Bottom Field Shift, additional artifacts are involved (flickering of horizontal edges in the image). Line Doubling with Bottom Field Shift is therefore inferior in quality to displaying both fields merged into one frame. However, it is used only as a fall-back solution when no other display method is possible.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Other features and advantages of the invention will become apparent in the following description of non limiting exemplary embodiments, with reference to the accompanying drawings, in which like reference numerals represent like parts, and in which:

FIG. 1 is a PRIOR ART diagram illustrating an exemplary structure of a field-based SPU given in the DVD standard;

FIG. 2 is a diagram illustrating a frame-based SPU obtained after transcoding the field-based SPU of FIG. 1 in accordance with one embodiment of the present invention;

FIG. 3 is a diagram illustrating modification of the sub-picture data within a SPU involved by the method of transcoding according to an exemplary embodiment of the present invention;

FIG. 4 is a block diagram illustrating a SPU Transcoder according to an exemplary embodiment of the present invention;

FIGS. 6 through 14 are flowcharts illustrating exemplary embodiments of main functional blocks forming part of the apparatus and method according to the exemplary embodiment introduced in FIG. 4 and FIG. 5, respectively;

DETAILED DESCRIPTION

Figure 5:
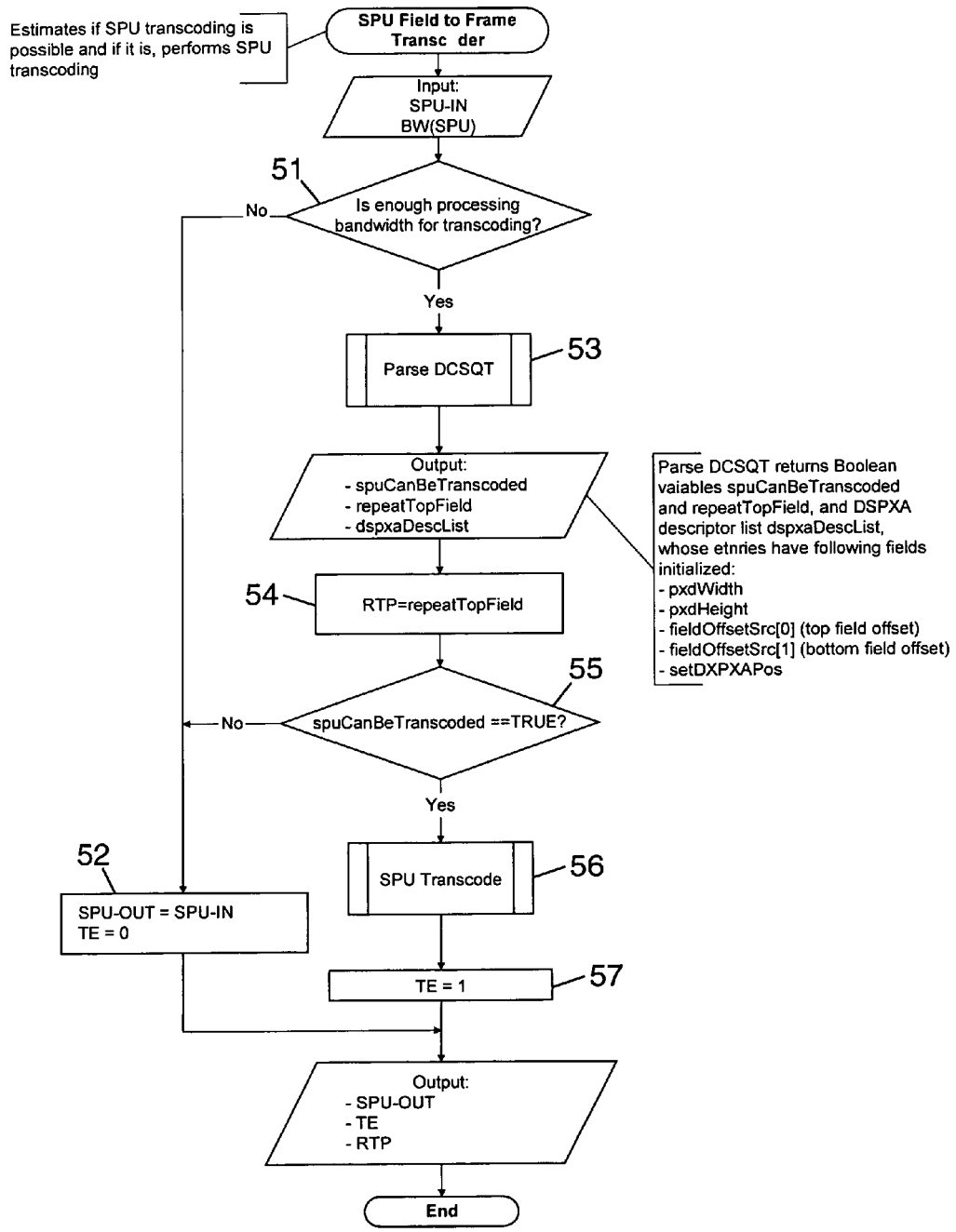
FIG. 5 is a flowchart illustrating the method of transcoding according to an exemplary embodiment of the invention.

FIGS. 2 through 16, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged image processing system.

Initially, it should be noted that the invention is described hereinafter in relation with sub-picture data defined in accordance with the DVD standard. This is however not limiting since sub-picture data complying with various alternative standards might be subject to the transcoding process of the invention.

FIG. 1 illustrates an example of SPU structure, which actually is proposed in the DVD standard. In the Figure, sub-picture data is shown as it is recorded on the DVD track. The Sub-Picture Unit (SPU) comprises a Sub-Picture Unit Header (SPUH), Pixel Data (PXD) and a Display Control Sequence Table (SP_DCSQT). PXD contains run-length compressed sub-picture bitmap data. SP_DCSQT contains set of Sub-Picture Display Control Sequences (SP_DCSQ) containing display control command sequences (DCSQ).

FIG. 2 illustrates an example of data structure for the SPU of FIG. 1 after transcoding into frame. SPUH is still the sub-picture unit header (the header is not affected by the transcoding), PXD-M designates compressed pixel data converted to frame format and SP_DCSQT-M designates a modified display control sequence table, containing display control commands modified to reflect change in pixel data.

Every DCSQ in a given SPU has execution time associated with it. SPU decoding can be described as executing DCSQ at its execution time and performing actions required by individual display control commands. PXD decoding is one of those actions.

Inside DCSQ, two display control commands of most interest with regard to the decoding are SET_DAREA (Set Display Area) and SET_DSPXA (Set Display Start Address of Pixel Data). SET_DAREA defines width and height of pixel data, and SET_DSPXA defines start position of top and bottom fields data inside PXD. A conventional (run-length) sub-picture decoder circuit starts decoding a field (e.g. top field) from start position, and then counts pixels until width defined by SET_DAREA is reached. It then concludes the end of line is reached, considers next run-length code as start of next line, and so on until height defined by SET_DAREA is reached. Lines are typically displayed as they are decoded, or collected and displayed at a later time. Once first field is finished (e.g. top field), the decoder proceeds with second field (e.g. bottom field) in a similar manner.

SET_DSPXA and SET_DAREA commands can be used to create simple video effects with sub-picture data, such as wipe and scroll. Or they can be used to access different areas inside PXD, for instance when PXD contains data for multiple different sub-picture bitmaps. In these cases there will be few (or many, in case of scroll or wipe) DCSQs inside a single SPU, containing SET_DSPXA and SET_DAREA commands with different values.

With this in mind, it can be concluded that SPU data format is defined for accessing blocks of PXD data at a time, each block corresponding to a line of sub-picture data. These blocks can be of different width, and they can be stored on non-continuous positions inside PXD. They can overlap, and same area can be used for top and for bottom fields. All this makes SPU transcoding from field format to frame format a non-trivial task.

However, by pre-processing SP_DCSQT it is possible to perform that task successfully. More specifically, by analyzing SP_DCSQT it is first possible to determine for any SPU whether transcoding can be performed. If transcoding is possible, SP_DCSQT provides enough information to collect all the data necessary for successful transcoding to frame format.

FIG. 3 illustrates the modification of the sub-picture data within a SPU involved by the transcoding according to an exemplary embodiment. A standard (field-based) SPU is depicted at the top of FIG. 3, and a corresponding transcoded (frame-based) SPU is depicted at the bottom. In the figure, a set of run-length encoded (compressed) data blocks (each having a length of 4, 8, 12 or 16 bits, and packed end-to-end within pixel data of the SPU), are shown separately for clarity reasons.

Compressed lines of top and bottom fields of PXD are interleaved into frames by copying lines of top and bottom fields one after another. Stated otherwise, the compressed lines of top field and of bottom field are merged into a full compressed frame. To this end, the beginning and the end of each compressed line can be found by parsing PXD, extracting pixel count from run-length codes, and then counting pixels until line width is reached. All of SET_DSPXA commands in the transcoded SPU shall be modified to reflect changed top and bottom field start positions in transcoded SPU.

It shall be noted that the operation of the transcoder according to a preferred embodiment is such that, if transcoding is not possible, SPU is left as it is. In this way, no useless processing is performed, and hence CPU power is saved. Besides, the format of the SPU, frame or field i.e., transcoded or unmodified, is signalled to the sub-picture decoder circuit as the SPU is delivered to it, as will become more apparent in view of the following.

FIG. 4 is a block diagram which illustrates an exemplary embodiment of a SPU field-to-frame transcoder circuit according to the invention.

In what follows, the SPU field-to-frame transcoder circuit 10 is simply referred to as "the transcoder". It can be thought of as "black box" having at least two inputs and three outputs.

A first input IN1 receives encoded (compressed) sub-picture data SPU-IN. Data SPU-IN is in the field format referred to in the introduction. It shall be noted that one whole SPU is collected (for instance, retrieved from the DVD disk track) and is then fed into the transcoder via input IN1. Stated otherwise, transcoder 10 processes whole SPUs.

A first output OUT1 outputs sub-picture data SPU-OUT which corresponds to sub-picture data SPU-IN transcoded into the frame format. Sub-picture data SPU-OUT is delivered to a sub-picture decoder circuit (or to a decoder driver circuit), not shown. It is assumed that the sub-picture decoder circuit is capable of decoding and displaying said transcoded sub-picture data. In one embodiment, the decoder circuit is also capable of decoding and displaying source (i.e. unmodified) sub-picture data, and of switching between transcoded and source mode on SPU granularity.

A second input IN2 of transcoder 10 simultaneously receives an information BW(SPU), that describes the required processing bandwidth as a function of the received SPU. In a preferred embodiment, information BW(SPU) is pre-defined and it does not change during operation. This is however not mandatory, and information BW(SPU) can change during operation if it is necessary.

A received SPU is first pre-processed by a so-called "Bandwidth Estimator" module 11. This module combines the incoming SPU with the information BW(SPU), and decides whether there is enough CPU (Central Processing Unit) power to transcode the SPU. One example of the information BW(SPU) will be given below. Bandwidth Estimator outputs a bit PBS (Processor Bandwidth Sufficient) with logic value 1 when there is enough CPU power and logic value 0 else.

Next step of pre-processing is performed by a module 12 called "DCSQT Parser" module. Its main role is to analyse display control commands inside the SP_DCSQT of the SPU, in order to collect control data CDT (Control Data for Tanscoding). Data CDT is delivered by module 12 to a so-called "SPU Transcoding Engine" module 13.

There are two more information resulting from analysis of commands by module 12. A first one is information whether structure of SPU is such that transcoding is possible for this SPU, and a second one is information whether PXD contains only one field. The former information is signalled by a bit TP (Transcoding Possible) set to the logic value 1 when transcoding is possible and to logic value 0 else. The latter information is signalled to the sub-picture decoder circuit via a bit RTF ("Repeat Top Field"), which is outputted through a second output OUT2 of the transcoder with logic value 1 when PXD contains only one field and the logic value else. Decoder can then use this bit RTF to display this SPU in a special mode wherein the only present field (typically the top field) is displayed twice. Such display mode is called Repeat Top Field mode. Stated otherwise, in Repeat Top Field mode, the only present field is displayed using the Line Doubling mode whereby it is repeated twice during display (first time when top field is to be displayed, second time when bottom field is to be displayed).

If both CPU power and SPU structure allow transcoding, SPU is fed to Transcoding Engine for processor-intensive processing. In the embodiment shown on FIG. 4, this is symbolized by a two-input AND gate 14 receiving bit PBS and bit TP as first input and second input respectively, and delivering a bit TE (Transcode Enable) at its output. Of course, function of the gate 14 is preferably performed by corresponding test instructions of a software (of the type IF . . . THEN . . . ELSE . . . ).

The SPU Transcoding Engine transcodes SPU from field format to frame format using data previously collected by pre-processing, namely data CDT. Data SPU-OUT is delivered at output OUT1 and contain SPU data transcoded to frame format.

Two sub-blocks can be isolated in Transcoding Engine module: first a so-called "PXD Field-to-Frame Converter" module 131, which interleaves lines of top and bottom fields into a single frame; and then a so-called "DCSQT Converter" module 132, which modifies display control commands according to changes in PXD data.

If transcoding is not possible (bit TE with logic value 0), SPU data is left unmodified and is supplied on output OUT1 as data SPU-OUT.

Format of SPU data, transcoded or source, is signalled to the sub-picture decoder circuit via bit TE which is delivered at a third output OUT3 of the transcoder 10. The decoder circuit can use this bit to set proper mode (transcoded or source) for SPU decode and display operations. The bit TE having a logic value 1 means that SPU is transcoded to frame format and should be displayed accordingly. When bit TE has logic value 0, SPU is not transcoded and should be displayed in Line Doubling mode with Bottom Field Shift if necessary. That is to say, top field of SPU is displayed in Line Doubling mode, and bottom field is displayed using Line Doubling mode and applying Bottom Field Shift.

FIG. 5 is a flowchart illustrating the field-to-frame transcoding method according to an exemplary embodiment of the invention. It is recalled that the aim of the SPU field-to-frame Transcoder is to estimate whether SPU transcoding is possible and, if yes, to perform SPU transcoding.

The field-to-frame transcoding method is advantageously carried out by software. It is implemented as a routine receiving data SPU-IN and information BW(SPU) as inputs, and producing data SPU-OUT and bits ST and RTF as outputs.

In step 51, it is established whether there is enough processing bandwidth (i.e., processing power) for transcoding the SPU. If the answer is no, the process jumps to a step 52 where SPU-IN is copied into SPU-OUT (SPU-OUT=SPU-IN) and where TE variable is set to false (TE=1). Then the process for the current SPU is over.

To the contrary, if answer to test 51 is yes, then, in step 53, DCSQT is parsed by activating the DCSQT Parser, that is to say by calling a corresponding sub-routine. This sub-routine returns two Boolean variables respectively spuCanBeTranscoded and repeatTopField, and a list called "DSPXA Descriptor List" (i.e. an appropriate memory pointer dspxaDescList, defining the head of the list into internal memory). Each entry in that list represents one block of top and bottom field data, defined by top and bottom field start byte position, and width and height. Byte position is relative to start of SPU-IN. More detailed description of the operation of this parsing step will be given below in reference to FIG. 6.

In step 54, the bit RTP is set to 1 or 0 depending on the Boolean value (TRUE or FALSE, respectively) of variable repeatTopField.

In a step 55, it is determined whether the SPU can be transcoded or not by testing the variable spuCanBeTranscoded. If the answer is no, the process jumps to step 52 and then reaches its end.

If the answer is yes, then in step 56, the SPU transcoding is performed by activating the SPU Transcoding Engine, that is to say by calling a corresponding sub-routine. This sub-routine comprises read-write access to the DSPXA Description List and write access to SPU-OUT data, as will be appreciated by considering description of the transcoding step in view of FIG. 7.

Once the SPU has been transcoded according to above step 56, bit TE is set to 1. This happens in step 57, after which end of the process is reached.

Advantageously, every functional blocks of the apparatus shown on FIG. 4, or every steps of the method illustrated by flowchart of FIG. 5, are carried out as software sub-routines. The invention can thus be implemented very easily into the target system without special hardware being required thereto. More detailed description of operation of each of these functional blocks will now be given in reference to the flowcharts of FIGS. 6 through 14.

Bandwidth Estimator

Information BW(SPU) is defined as generic information because there are many possible methods to estimate processor bandwidth required for transcoding of any particular SPU. Such a method consists in defining different information BW(SPU) and designing related Bandwidth Estimator module capable of using this information. For example, one way to define information BW(SPU) could be to define it as a number of MIPS (Millions of Instructions Per Second). Another way could be to define it as a percentage of processor utilization. Yet another way is to define it as the time required for SPU transcoding. Other ways are possible.

Depending on what particular BW(SPU) information is chosen, specific Bandwidth Estimator module has to be designed. It has to be capable of calculating value based on chosen BW(SPU) and incoming sub-picture data (data SPU-IN), comparing obtained value with a previously defined criteria and deciding whether enough bandwidth (CPU power) for transcoding of a given SPU is available or not.

One example of information BW(SPU) function and accompanying Bandwidth Estimator module is presented below.

According to this example, information BW(SPU) is defined by a function $\Delta Ttr$ applied to the SPU, whose result $\Delta Ttr(SPU)$ is the time interval required to transcode the SPU from field format to frame format. More specifically, information BW(SPU) is defined as being identical to $\Delta Ttr(SPU)$, that is $$BW(SPU) = \Delta Ttr(SPU) \tag{1}$$

One possible way to define the function $\Delta Ttr(SPU)$ is to establish a constant TB corresponding to the time interval required for transcoding one byte of sub-picture data. Function $\Delta Ttr(SPU)$ is then simply defined [in second] as $$\Delta Ttr(SPU) = TB * sizeof(SPU) \tag{2}$$

where TB is the time interval required for transcoding one byte of sub-picture data [in second/Byte], and where sizeof(SPU) is the number of bytes in the SPU [in Byte].

Other definitions of function $\Delta Ttr(SPU)$ are possible, that could eventually give more accurate estimate of the time interval.

With implementation of the transcoder 10 given on FIG. 4, one important feature of constant TB is that it should represent the maximum time interval for decoding a byte of SPU. This is to ensure that transcoding of sub-picture data will be finished on time for display, no matter what kind of incoming sub-picture data will be processed.

To do so, different incoming sub-picture data should be profiled on the target system once the transcoder is implemented. Profiling consists in transcoding different test streams of SPUs on the target system, and in recording time interval needed to transcode each SPU. In particular, following sub-picture test streams are to be included in a profiling session: a stream at maximum sub-picture bit rate, a stream at maximum SPU size, and a stream at maximum sub-picture resolution. For every sub-picture data unit $SPU_i$ having indicia i, transcoding time interval per byte $TB_i$ is calculated as being the time interval required for the transcoding divided by the size of the sub-picture data unit $SPU_i$:

$$TB_i = \Delta Ttr_i / \text{sizeof}(SPU_i) \quad (3)$$

where $\Delta Ttr_i$ is the time interval spent for decoding $SPU_i$ and where sizeof($SPU_i$) is the number of bytes in the Constant TB is then taken as a maximum of all the available values $TB_i$.

When above defined function $\Delta Ttr(SPU)$ is used as information BW(SPU), operation of the Bandwidth Estimator module is quite simple. It calculates the time interval required for transcoding incoming SPUs by evaluating function $\Delta Ttr$(SPU), which in this case comes to simple multiplication of the size of the SPU by constant TB:

$$\Delta Ttr(SPU) = TB * \text{sizeof}(SPU) \quad (4)$$

This time interval is then used for comparison with the time Tp for presentation (display) of the SPU. Let us note Tcurr the current time extracted from a system clock. The absolute time when transcoding would be finished, hereinafter referred to as Ttr, is calculated as:

$$Ttr = Tcurr + Ttr(SPU) \quad (5)$$

If Ttr is less or equal to Tp, enough processing bandwidth is available for transcoding the SPU. The bit PBS (Processor Bandwidth Sufficient), which is outputted by the Bandwidth Estimator module is set to the logic value 1. If Ttr is greater than Tp, there is not enough bandwidth available for transcoding, and bit PBS is set to logic value 0.

DCSQT Parser

Figure 6:
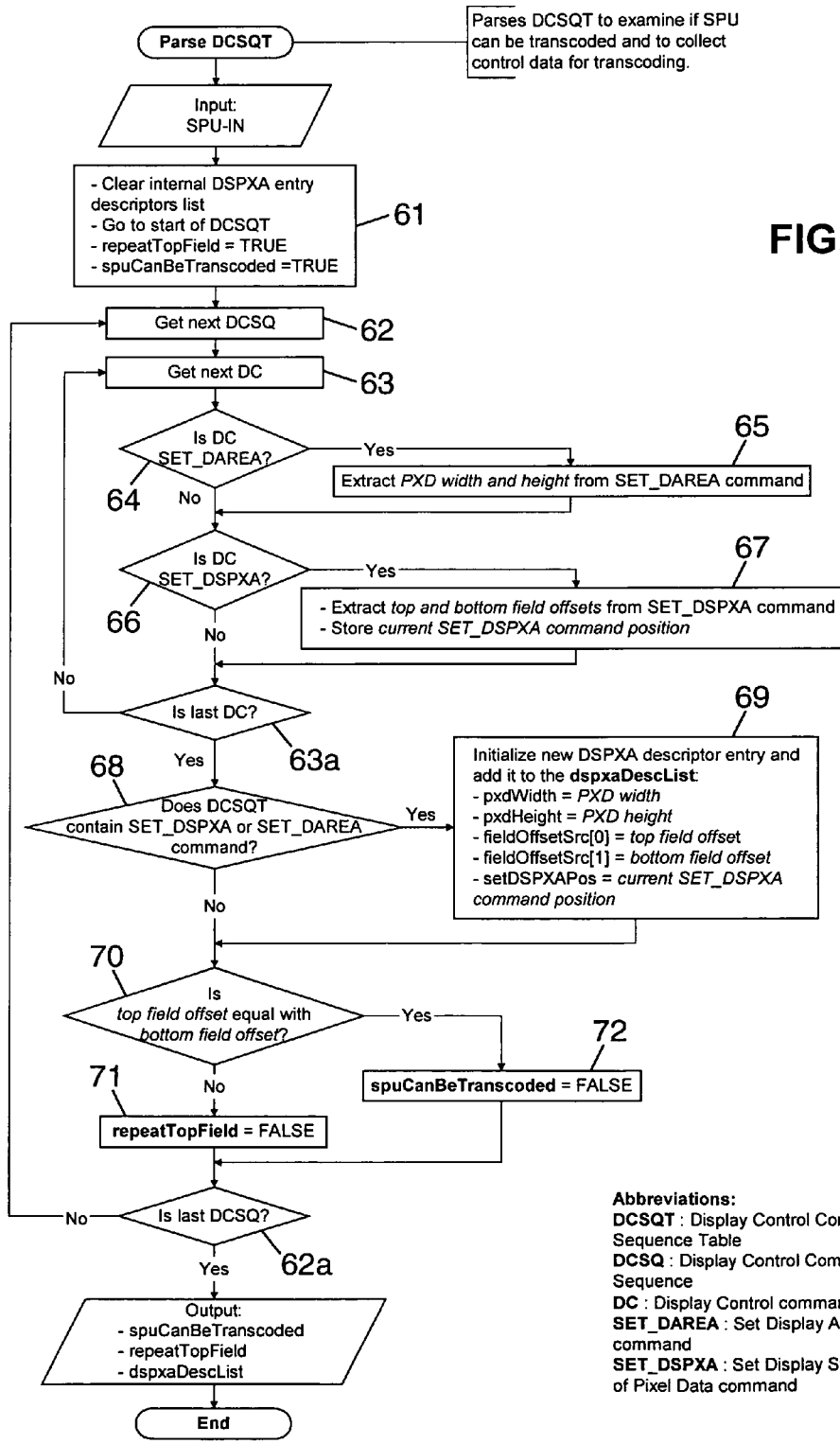

Operation of the DCSQT Parser (i.e., the module depicted in FIG. 5 under reference number 12) is illustrated by flowchart of FIG. 6.

It is implemented as a software sub-routine which is passed as input one complete SPU of data SPU-IN, and returns as output Boolean variables spuCanBeTranscoded and repeatTopField, and the DSPXA Descriptor List.

More specifically DCSQT Parser processes each incoming SPU and prepares the DSPXA Descriptor List, which is a list of control data for later use in transcoding. Its function is to examine whether the SPU can be transcoded and to collect control data for later transcoding. To this end, after an initialisation step 61, DCSQT Parser goes through SP_DCSQT to isolate single DCSQs (steps 62 and 62a) and to isolate single DCs (steps 63 and 63a) within each DCSQ, and looks for SET_DAREA and SET_DSPXA commands (step 64 and 66).

From these commands it then extracts PXD width and height (step 65), and top and bottom field start positions (step 67), and stores these values in the DSPXA Descriptor List (step 68, and step 69 of updating DSPXA Descriptor List).

Based on values extracted from SP_DCSQT, DCSQT Parser also generates, in steps 70 and 71, information about SPU being transcodable or not (by way of so-called spuCanBeTranscoded variable), and, in steps 70 and 72, whether top field can be repeated (by so-called repeatTopField variable). It shall be noted that spuCanBeTranscoded variable is set to FALSE if the top field offset is equal to the bottom field offset, and that repeatTopField variable is set to FALSE should the opposite occur (where both variables had been initialised as TRUE during the initialisation step 61).

DSPXA Descriptor List plays major role in SPU transcoding. It is first generated by DCSQT Parser and used (through read-write access) by the rest of the apparatus.

DSPXA Descriptor List is a list of DSPXA entries. Such a DSPXA entry coresponds to a given DCSQ containing either SET_DSPXA, SET_DAREA or both. It shall be noted that every time such DCSQ is encountered, new DSPXA entry is created. One DSPXA entry represents one block of top and bottom field data, defined by top and bottom field start byte position, and width and height. Byte positions are relative to the start of SPU. These blocks are used as basic unit for interleaving top and bottom field lines.

Apart from defining blocks of PXD, another role of DSPXA entry is to hold fields necessary for modifying DCSQT in transcoded SPU (which modification is done by DCSQT Converter).

Any DSPXA entry is a memory structure having following fields:

"pxdWidth", which contains the PXD width;
"pxdHeight", which contains the PXD height;
"fieldOffsetSrc", which contains a two dimensional variable for both the field start offset in incoming (source) SPU, respectively of top field (i.e., fieldOffsetSrc[0]), and of bottom field (i.e., fieldOffsetSrc[1]);
"fieldOffsetDest", which contains a two dimensional variable for both the field start offset in transcoded SPU, respectively of top field (fieldOffsetDest[0]), and of bottom field (fieldOffsetDest[1]);
"setDSPXAPos", which contains position of SET_DSPXA command.

The value corresponding to PXD width, which is extracted from SET_DAREA command by DCSQT Parser, is later used for getting line length. The value corresponding to PXD height is extracted from SET_DAREA command by DCSQT Parser. The values corresponding to top field (variable fieldOffsetSrc at index 0) and bottom field (variable fieldOffsetSrc at index 1) start byte offsets are extracted from SET_DSPXA command by DCSQT Parser. These are start positions where fields are read from. The values corresponding to top field (variable fieldOffsetDest at index 0) and bottom field (variable fieldOffsetDest at index 1) start byte offsets in transcoded SPU (SPU-OUT) are filled by the PXD Field to Frame Converter (i.e., the module depicted under reference 131 in FIG. 5) during line interleaving process. They are later used by DCSQT Converter (i.e., the module depicted under reference 132 in FIG. 5) as new values for SET_DSPXA commands in transcoded SPU. Concerning now field setDSPXAPos, whenever DCSQT Parser finds new SET_DSPXA command, its byte position is stored in this field. DCSQT Converter later uses this field to access SET_DSPXA commands in transcoded SPU to replace top and bottom field offsets in SET_DSPXA commands with corrected values from field fieldOffsetDest.

DSPXA Descriptor List is sorted by fieldOffsetSrc[0] (i.e., by value of the start offset of the top field in incoming (source) SPU) in ascending order. This is advantageous not only for optimisation reasons, but also because this is first step towards "block overlapping". Successive SET_DSPXA commands can access blocks scattered around PXD, and sorting them by top field offset makes them ready for correct interleaving into frame. Thus, the list of blocks is then ready to be used in optimal block copying, whereby the only remaining step is to carry out block overlapping.

SPU Transcoding Engine

A flowchart illustrating operation of the SPU Transcoding Engine is shown on FIG. 7. It is activated only when it is guarantied that SPU can be transcoded.

SPU Transcoding Engine is implemented as a software sub-routine on which one complete SPU of data SPU-IN and the DSPXA Descriptor List (pointer dspxaDescList) are passed as input, and which returns as output pixel data once converted to frame format (stored in data SPU-OUT) as well as DSPXA Descriptor List modified to reflect change in pixel data.

It comprises mainly a first step 73, implemented as a sub-routine called "Convert PXD", which converts pixel data from field format to frame format, and a second step 74, implemented as a sub-routine called "Convert DCSQT" which then modifies DCSQT accordingly.

PXD Converter

Figure 8A:
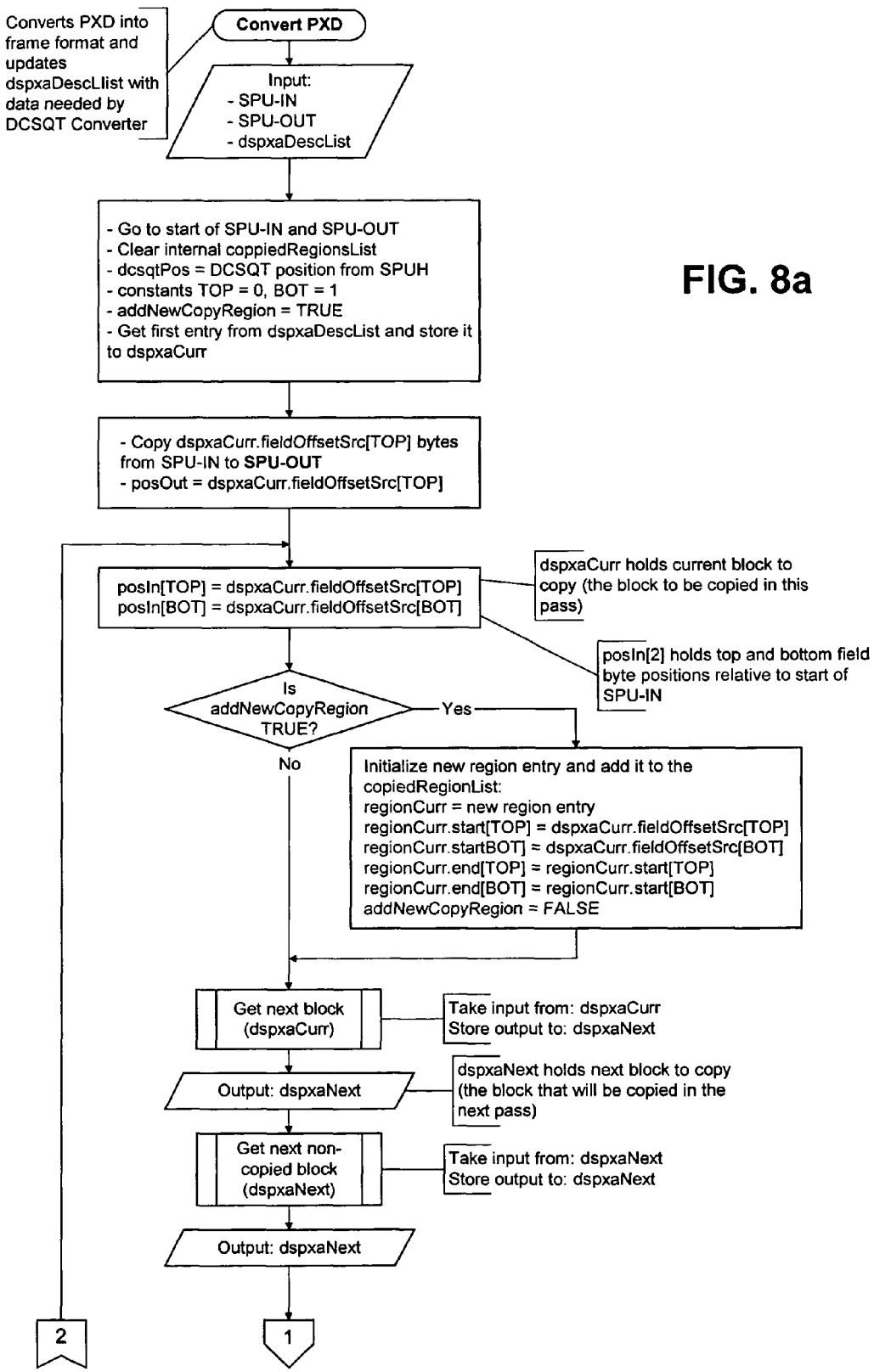
Figure 8B:
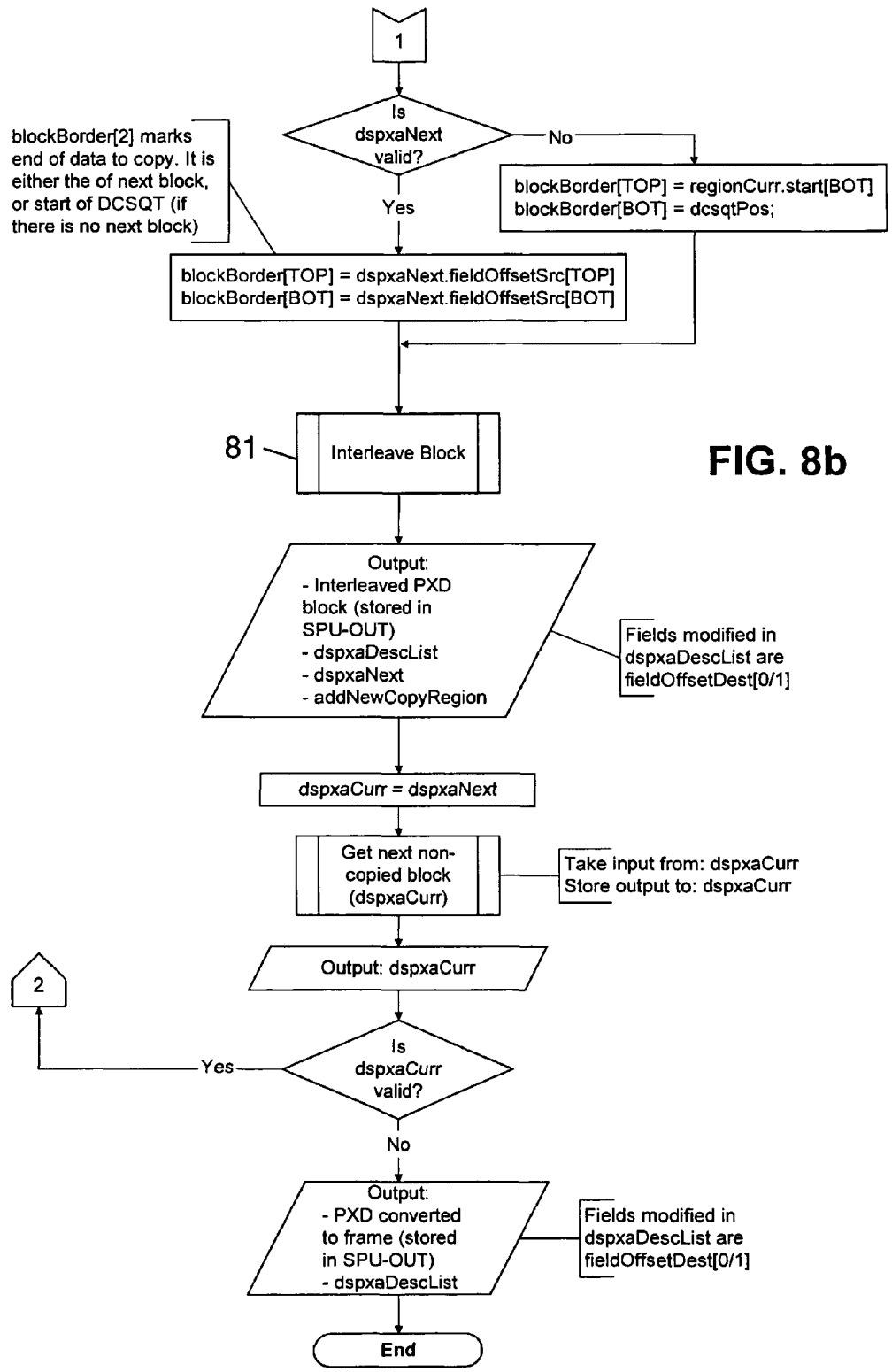

A flowchart illustrating the PXD Converter sub-routine is shown on FIG. 8*a* and FIG. 8*b* (the former being continued on the latter). PXD Converter converts PXD into frame format and also updates DSPXA Descriptor List with data needed by DCSQT Converter for modifying SP_DCSQT in the transcoded SPU. The task it executes is to obtain blocks for interleaving from DSPXA Descriptor List, cross-reference them with already copied regions and filter out blocks that are already copied to transcoded SPU (SPU-OUT). Only non-copied blocks will be taken and passed on to Interleave Block sub-process (see flowchart shown on FIG. 9*a* and FIG. 9*b*) for interleaving to frame format.

The PXD Converter sub-routine uses an internal list called Copied PXD Regions List, which list contains entries each corresponding to so-called Copied PXD Region. Every Copied PXD Region entry represents one continuous region of copied (interleaved) top and bottom field data, defined by start and end byte positions for top and bottom field respectively. One region can cover one or more blocks stored in the DSPXA Description List (accessible through the "dspxaDescList" pointer). Most often one region corresponds to one single bitmap inside multiple-bitmap PXD, but in general case this relation is not necessary a one-to-one relation.

The Copied PXD Region data structure has following entries:
  "start", which is a two dimensional variable for containing region start offset for both top field ("start[0]") and bottom field ("start[1]");
  "end" which is a two dimensional variable for containing region end offset for both top field (end[0]) and bottom field ("end[1]").

The field corresponding to region start offset for top field (start[0], i.e., variable "start" at index 0) and bottom field ("start[1]", i.e., variable "start" index 1) is initialised to current block start each time a new region is started. The field corresponding to region end offset for top field ("end[0]", i.e., variable "end" at index 0) and bottom field ("end[1]", i.e., variable "end" index 1) is initialised to current block start each time a new region is started, and is then updated with current position in PXD during block interleaving as long as this is the region currently being copied/interleaved.

The general idea of the Convert PXD sub-process is to go through DSPXA Descriptor List and to interleave and copy all the blocks in the list. Every entry in DSPXA Descriptor List describes start position and width and height of one block that could be interleaved in one pass. Since these blocks could overlap, one possible approach to interleave them would be to perform "block overlapping" first to exclude duplicate lines, and then proceed with interleaving top and bottom field lines. However, only byte offset of the start of the block is known, and because width and height of the block are available in pixels, byte offset of the end of the block in PXD is unknown. Therefore PXD has to be parsed to determine the end of the block, namely to find out respective ends of the lines and count them until height of the block is reached. This in essence is what is done by "Interleave Block" sub-process depicted under reference 81 in FIG. 8*b*. For optimisation reasons, actual data copy from SPU-IN to SPU-OUT is also done at the same stage.

In short, the process of PXD interleaving can be described as follows (see flowcharts of FIGS. 8*a* and 8*b* for more details). Starting with first block from DSPXA Descriptor List (this list being sorted by top field offset), all the top and bottom field data are interleaved before the beginning of next block. Once this is done, blocks from DSPXA Descriptor List starting with next block are cross-referenced with already interleaved and copied regions from Copied PXD Regions List. The current end of the Copied PXD Region is updated by Interleave Block sub-routine as block interleaving and copying is carried out (step 81). The first block that is not already copied will be taken as next block and passed on to "Interleave Block" sub-routine for interleaving and copying into the transcoded SPU (SPU-OUT data). The process is repeated until all the blocks have been interleaved and copied.

Main aspects of the PXD Convert sub-routine will now be described in more details.

Interleave Block

Figure 9A:
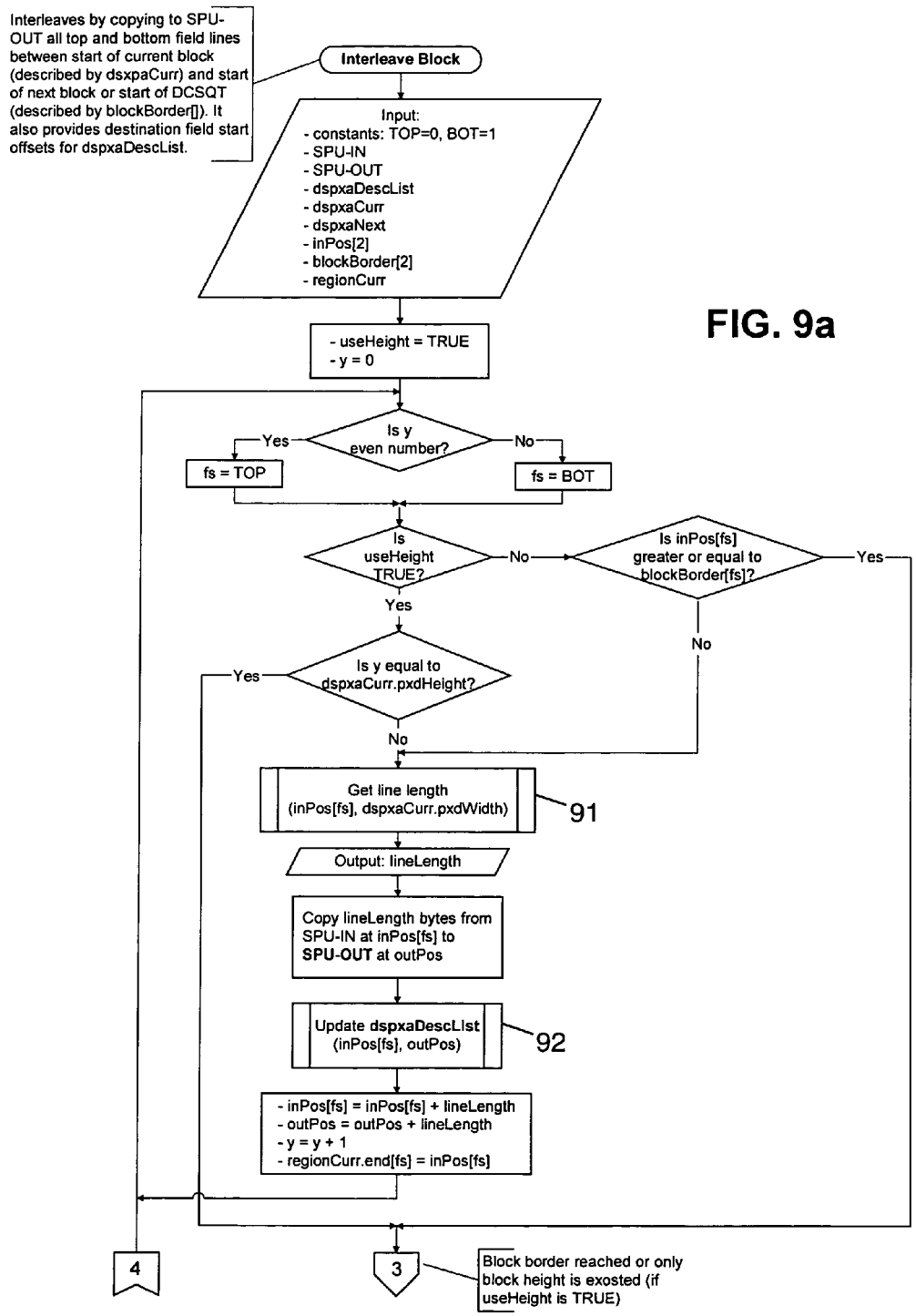
Figure 9B:
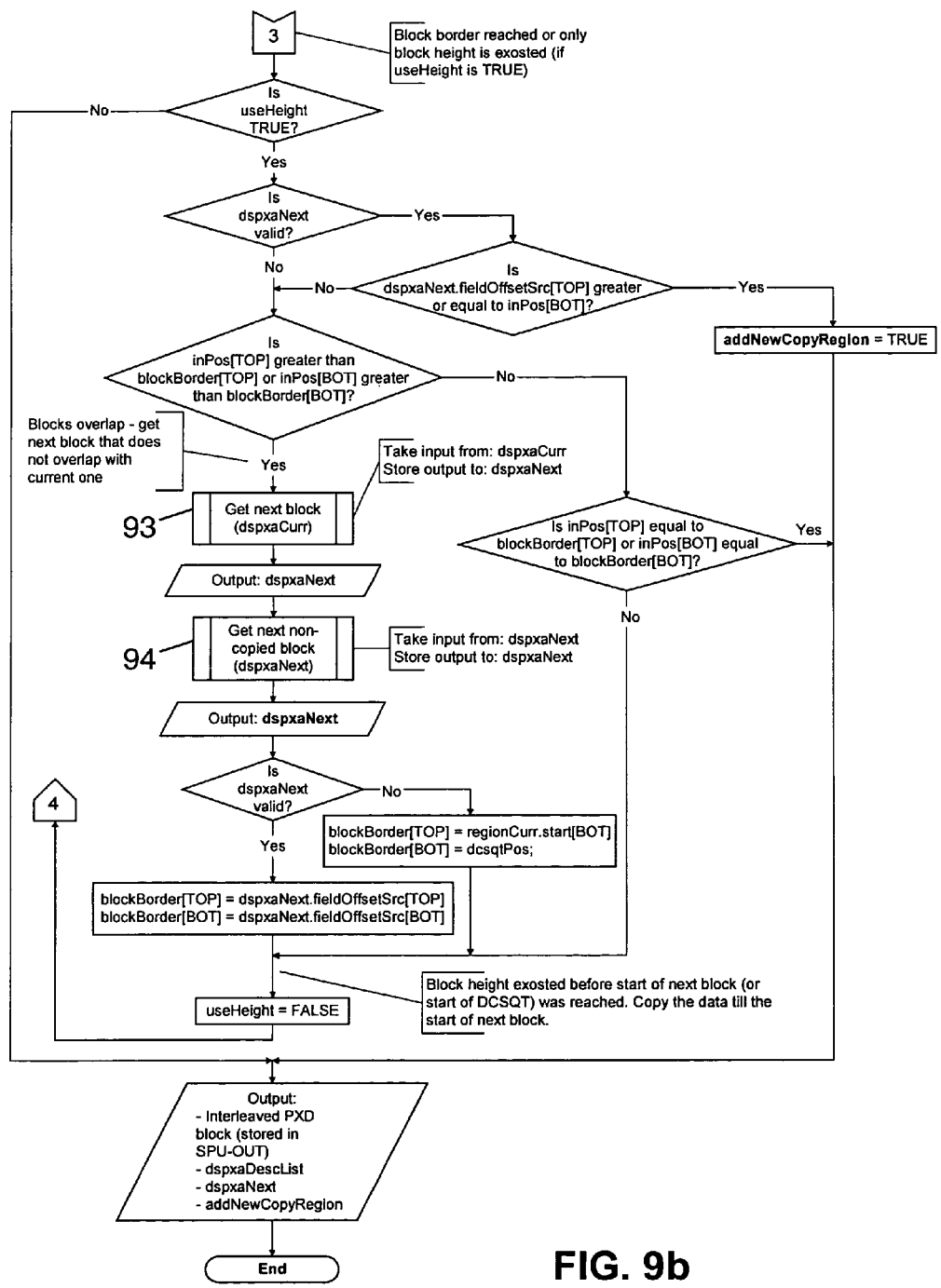

Flowchart of FIGS. 9*a* and 9*b* further illustrates step 81 of block interleaving (FIG. 9*a* is continued on FIG. 9*b*). The "Interleave Block" sub-process performs actual line-by-line field interleaving by alternating top and bottom filed lines while copying them one after another into the transcoded SPU (SPU-OUT data). It also updates field destination offsets in the DSPXA Descriptor List that will be later used by the DCSQT Converter. This is done by so-called "Update DSPXA Descriptor List" sub-process.

The "Interleave Block" sub-process interleaves block of data starting at beginning of current block and ending at beginning of next block. Interleaving starts with first top line in a block. First the length (in bytes) of top field line is determined and said top field line is copied from source SPU (data SPU-IN) to transcoded SPU (data SPU-OUT). Then, the same is done for the bottom field line. The bottom field line is copied into SPU-OUT right behind the top field line. Next line of the top field will be copied right behind bottom field line and so on. Stated otherwise, each blocks of top field line and of bottom field line alternately are copied end-to-end into the transcoded SPU. The foregoing is then repeated until a number of lines corresponding to the height of the block is interleaved.

If after interleaving said number of lines there is still some data left before the beginning of the next block, Interleave Block will then interleave this rest of data. Such gap between the so reached height of the block and the beginning of next block can occur if, for instance, same PXD is used as top field by a given SET_DSPXA command and as bottom field by next SET_DSPXA command.

Also, if after interleaving a number of lines corresponding to the height of the block it is determined that next block overlaps with current one (i.e., if the next block starts somewhere inside the current block), the first block that starts outside current block (normally the second next block) is searched and next block is then updated before proceeding with interleaving the gap between the reached height of the current block and the beginning of the next block.

Interleave Block sub-process is also in charge of determining whether the end of current continuous PXD region is reached. Since data for one field must be continuous in PXD, if the top field of next block starts after current end of the bottom field, end of region is reached and request to start new PXD region is signalled.

Amongst various steps carried out by Interleave Block sub-process, so-called "Get Line Length" sub-process (step 91), "Update DSPXA Descriptor List" sub-process (step 92), "Get Next Block" sub-process (step 93), and "Get Next Non-copied Block" sub-process (step 94) will now be explained in more details.

Update DSPXA Descriptor List

Figure 10:
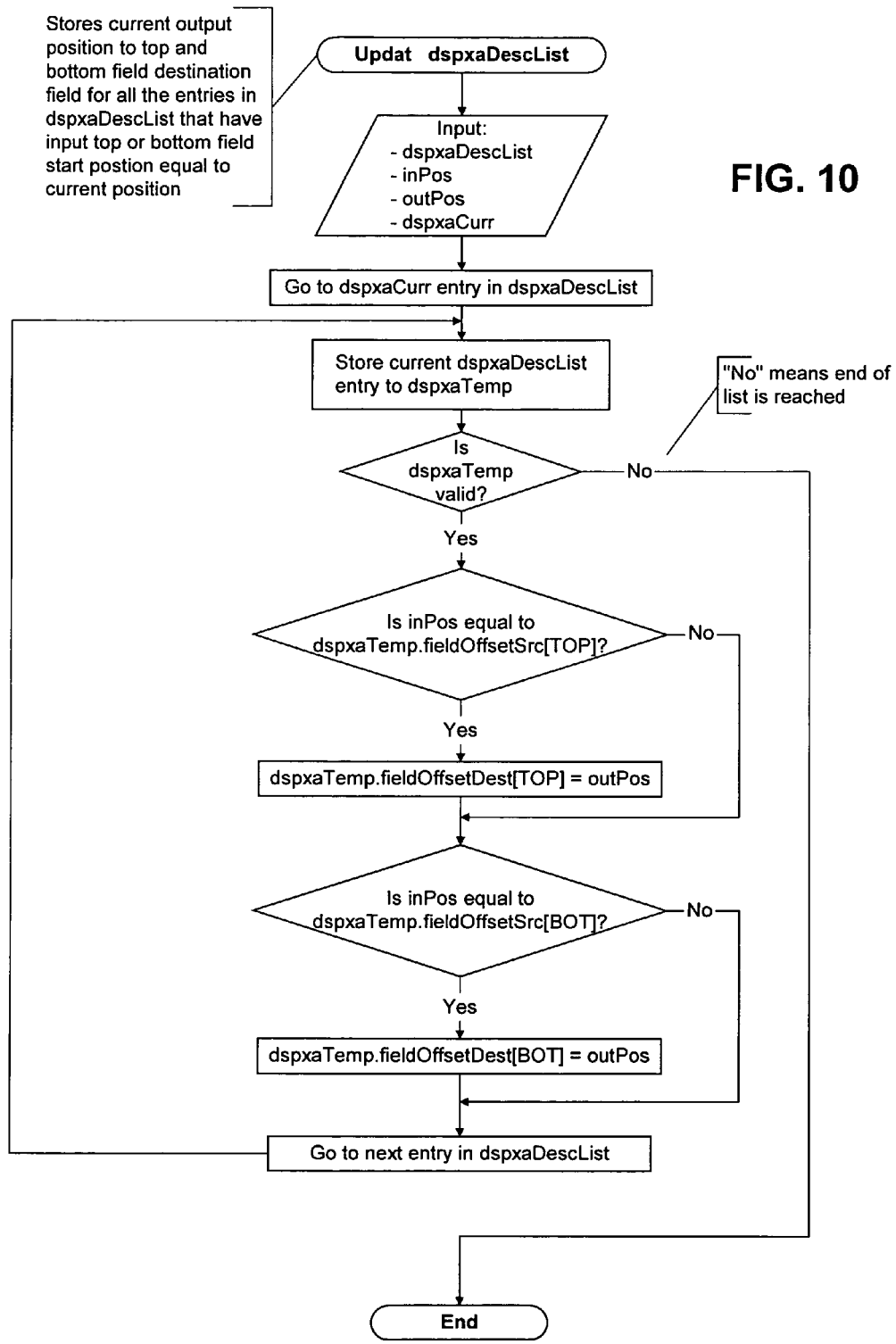

A flowchart illustrating this sub-process is shown on FIG. 10. This is the sub-process that cross-references all the entries in the DSPXA Descriptor List with current position in source SPU (SPU-IN data). For all the entries that have source top or bottom field start position (which is defined by variable "fieldOffsetSrc[0]" or "fieldOffsetSrc[1]" respectively) equal to the current input position, it stores current destination position (that is to say the position in transcoded SPU) as destination top or bottom field start position (which is defined by variable fieldOffsetDest[0] or fieldOffsetDest[1]) respectively, to be used later by "DCSQT Converter" sub-process.

Get Line Length

Figure 11:
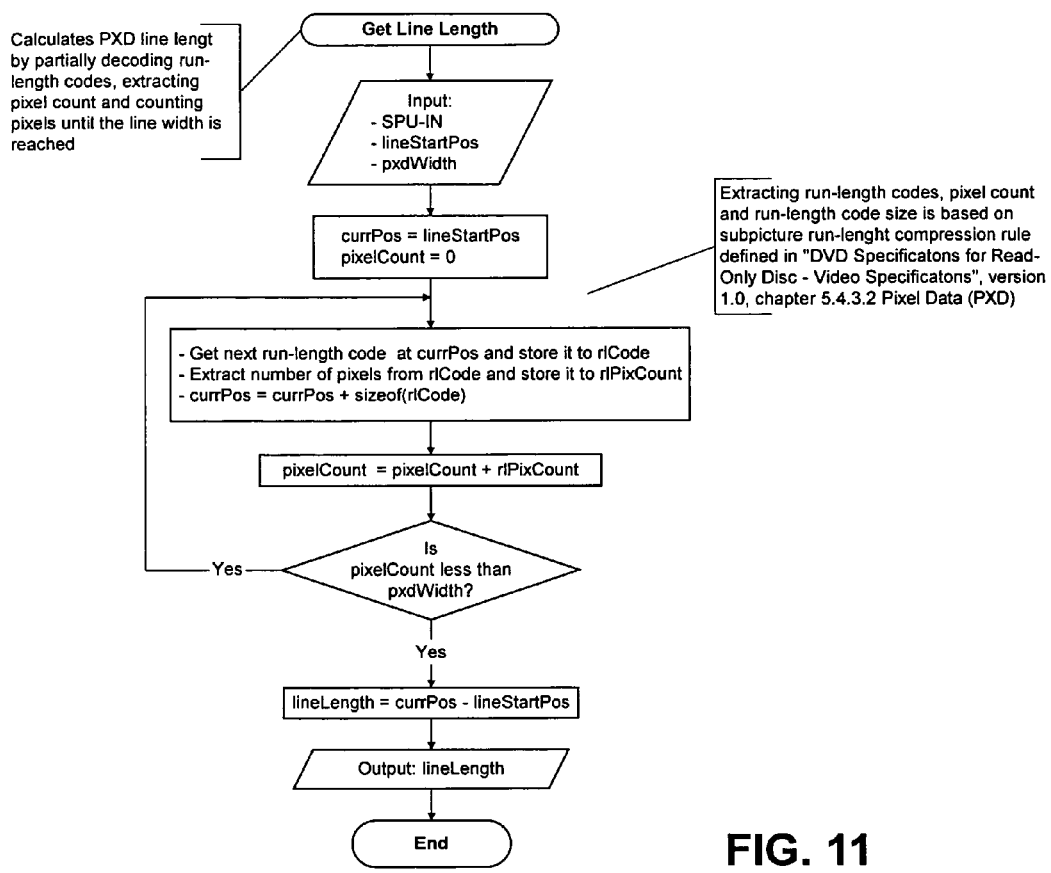

A flowchart illustrating this sub-process is depicted on FIG. 11. It calculates the line length in PXD data (the latter being in the compressed form) by parsing the data, extracting run-length code, partially decoding them to extract pixel count, and counting the pixels until the line width for current block is reached. Line width which is passed to the Get Line Length sub-routine is always taken from currently processed block, which ensures that fields will be properly interleaved no matter how many times sub-picture width changes inside single SPU.

Get Next Block

Figure 12:
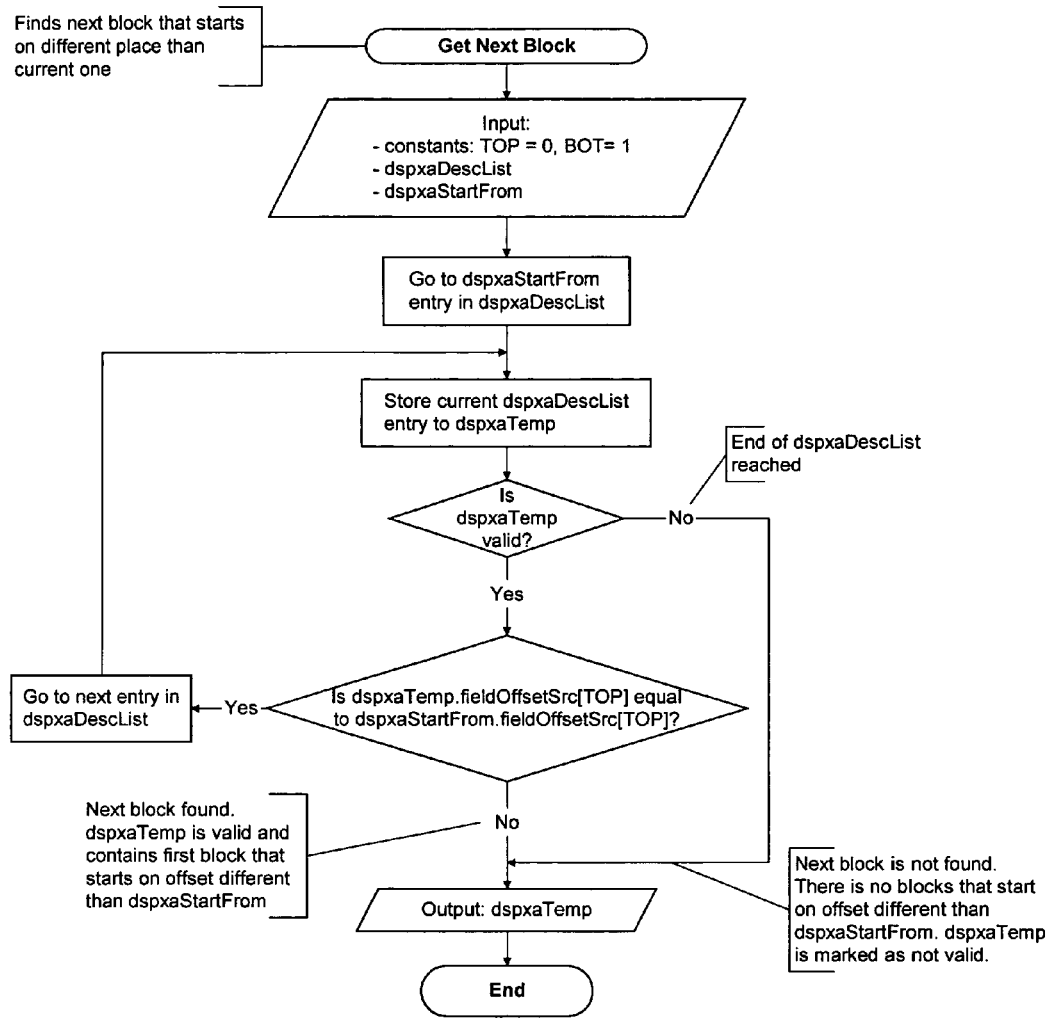

Get Next Block sub-process flowchart is shown on FIG. 12. This is the sub-process that looks for first block that starts on byte position different than current one.

Get Next Non-Copied Block

Figure 13:
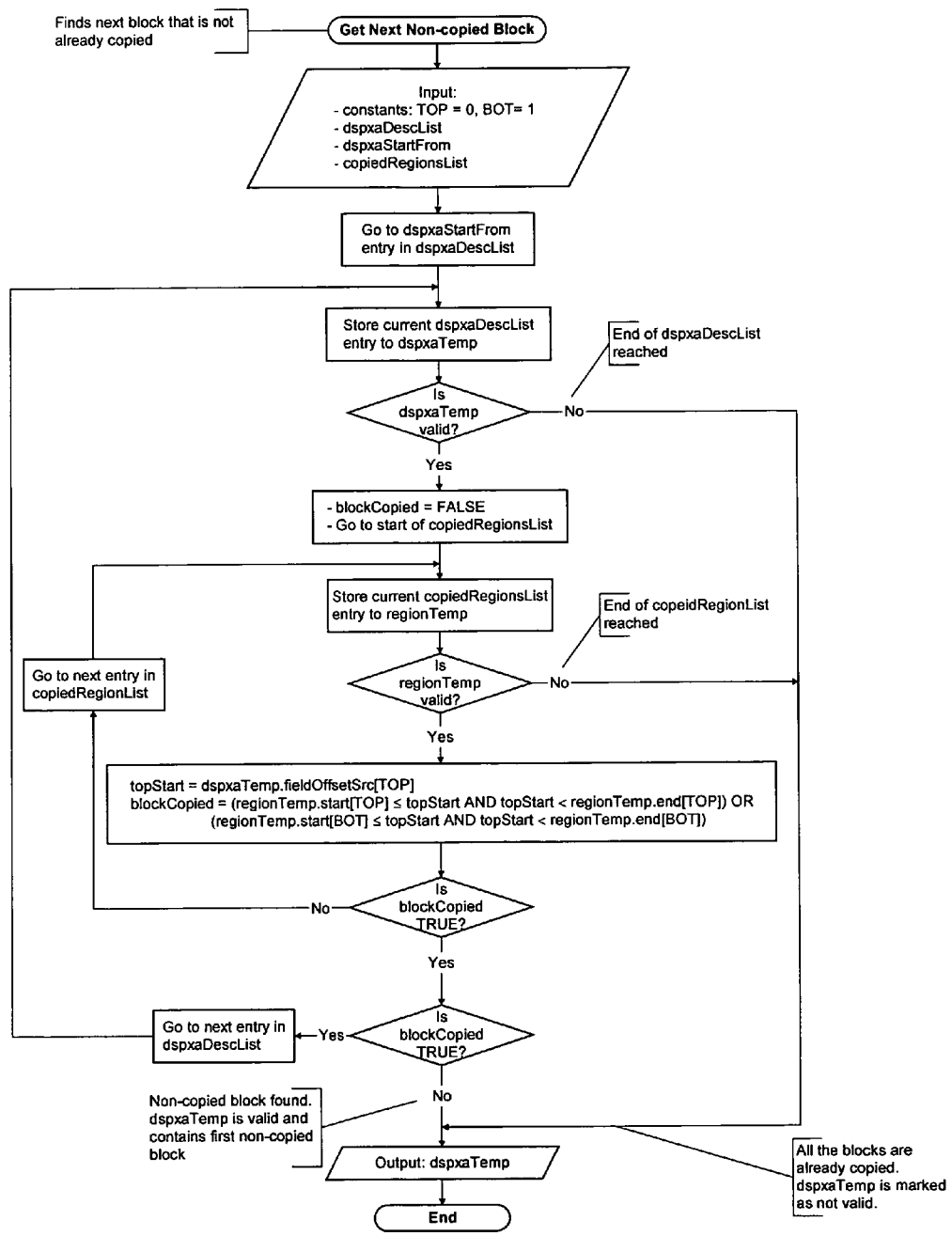

Get Next Block sub-process flowchart is shown on FIG. 13. Its function is to cross-reference blocks from the DSPXA Descriptor List with Copied PXD Regions List and returns first block that is not already copied.

DCSQT Converter

Figure 14:
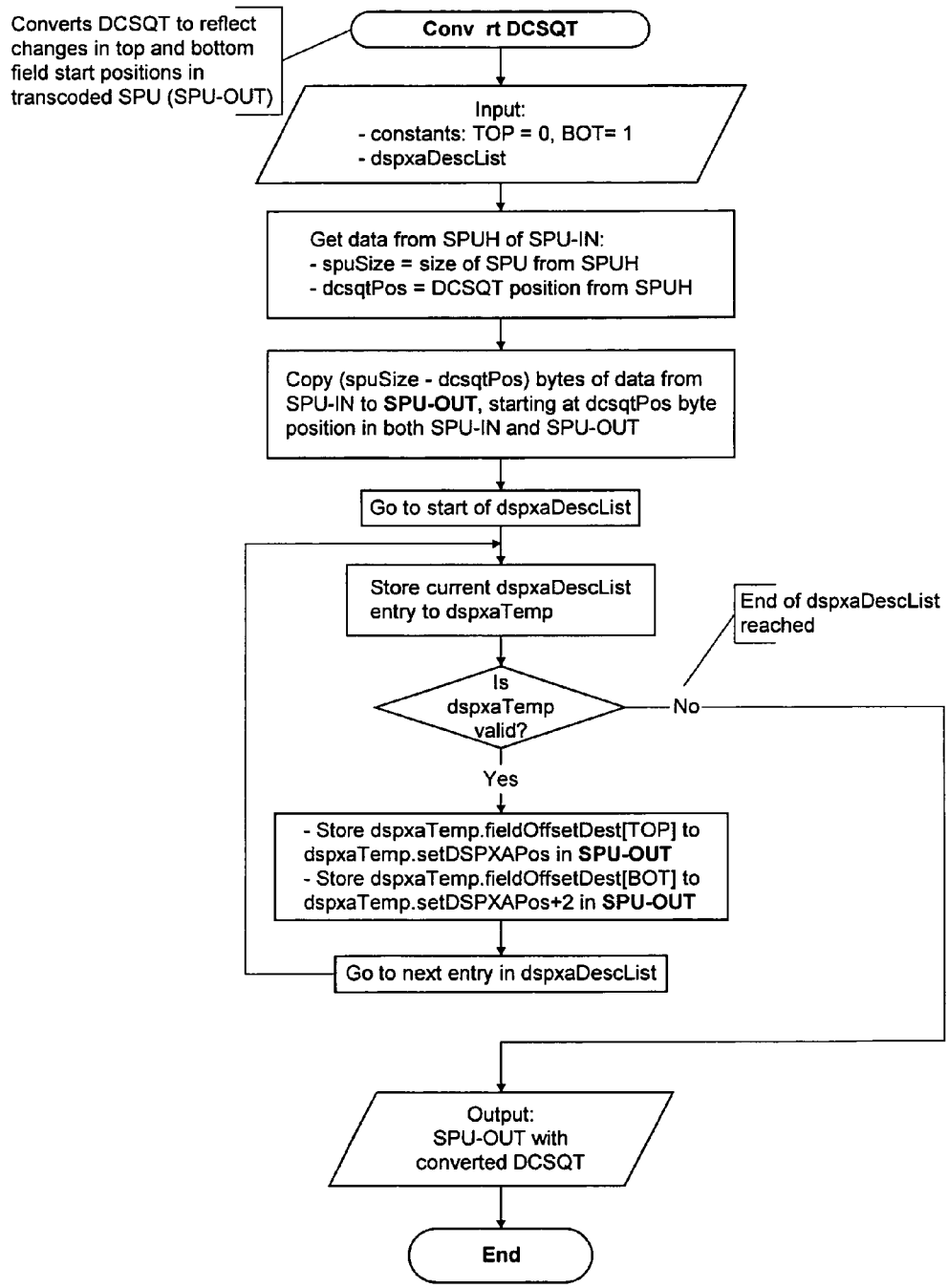

FIG. 14 is a flowchart which illustrates DCSQT Converter sub-process. This sub-process modifies all SET_DSPXA commands in DCSQT of transcoded SPU (SPU-OUT data) so that they point to new top and bottom field start positions. Because top and bottom field lines in SPU-OUT are interleaved (copied one behind another), field start positions are completely different than original start positions in SET_DSPXA commands. DCSQT Converter goes through the DSPXA Descriptor List, each entry of which represents one SET_DSPXA command, and changes top and bottom field offset to a new value.

Figure 15:
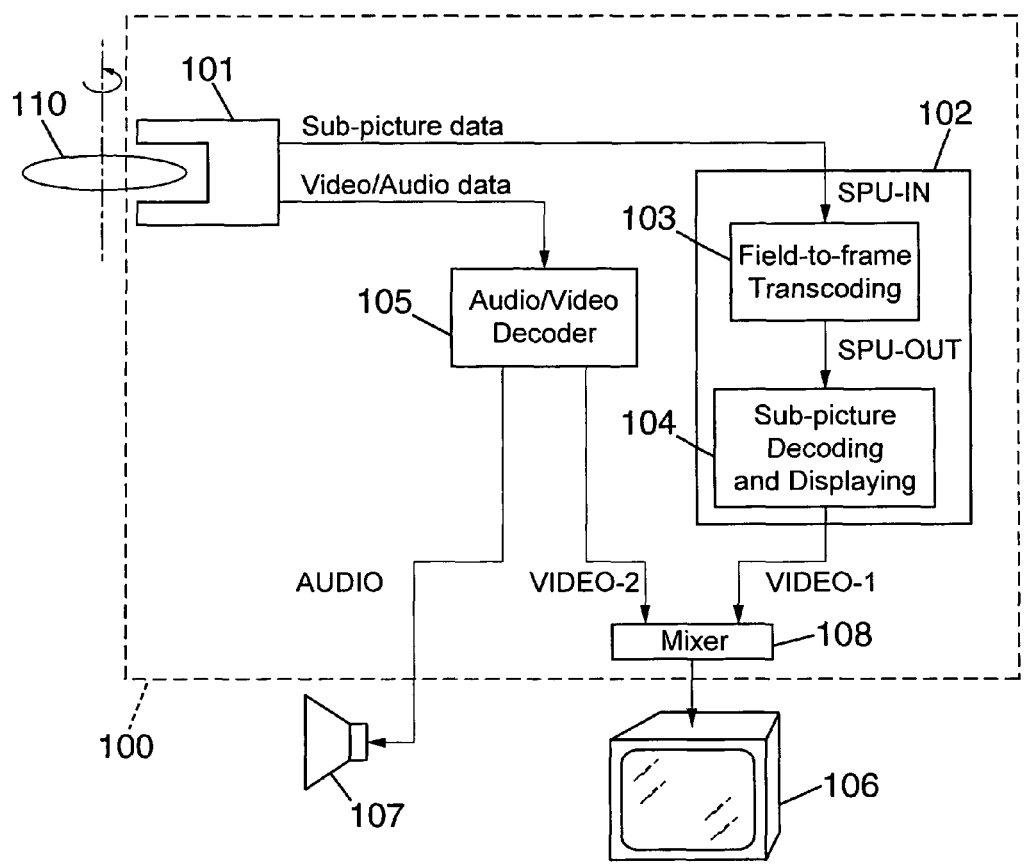
FIG. 15 illustrates a block diagram of a system according to the present invention.

FIG. 15 shows a block diagram of a video display system according to the invention, which consists for instance in a DVD player complying with the DVD standard.

The system 100 comprises a source 101 of sub-picture data in the form of a stream of SPUs each comprising encoded sub-picture pixel data and a set of display control commands associated with the sub-picture pixel data. Such source consists e.g. in the reading means of the DVD player. Such means is adapted to retrieve data from an optically readable digital record carrier 110 such as a DVD. More generally, it outputs both a first stream of sub-picture data units (SPU-IN), and a second stream of digitally compressed video/audio data units (e.g. complying with MPEG-1 or MPEG-2 standard).

The system further comprises a field-based sub-picture decoder circuit 102 which receives said stream SPU-IN of sub-picture data units at the input and delivers a first video signal VIDEO-1 at the output. This circuit comprises hardware and software means 104 for decoding and displaying the sub-picture pixel data encoded into SPUs, based on corresponding display control commands. Such circuit might be of any type of the sub-picture decoder circuits readily available on the market, in which hardware means are simply modified first to increase by one the number of bits of the lines counter and secondly to add a line-doubling module and a bottom field shift module to make the decoder capable of handling the cases where transcoding is not possible. Decoder 104 is coupled to an external display 106 such as a CRT (Cathode Ray tube) on which sub-picture data (mainly sub-titles or menu highlights) contained in signal VIDEO-1 is displayed.

The system also comprises an apparatus for transcoding 103 as defined above, which is arranged for receiving as an input the stream SPU-IN of sub-picture data units and for delivering as an output a stream SPU-OUT of frame-transcoded sub-picture data units to said means 104 of decoder 102. In one advantageous embodiment depicted in FIG. 15, apparatus 103 is embodied as software means into sub-picture decoder circuit 102. This however is nonetheless mandatory.

System 100 further comprises a video/audio decoder circuit 105, e.g. a MPEG-1 or MPEG-2 audio/video decoder, which is adapted first for decoding and displaying video data by generating a second video signal VIDEO-2 and second for decoding and restoring audio data by generating an audio signal AUDIO. To this end, decoder 105 is coupled through the mixer 108 to the display 106, on which video data contained in signal VIDEO-2 is displayed. It is also coupled to at least one external loudspeaker 107 which restores audio data contained in signal AUDIO.

Finally, system 100 comprises the mixer 108 for merging sub-picture data VIDEO-1 and picture data VIDEO-2. This mixer output a single video signal which is fed to the display 106.

Figure 16:
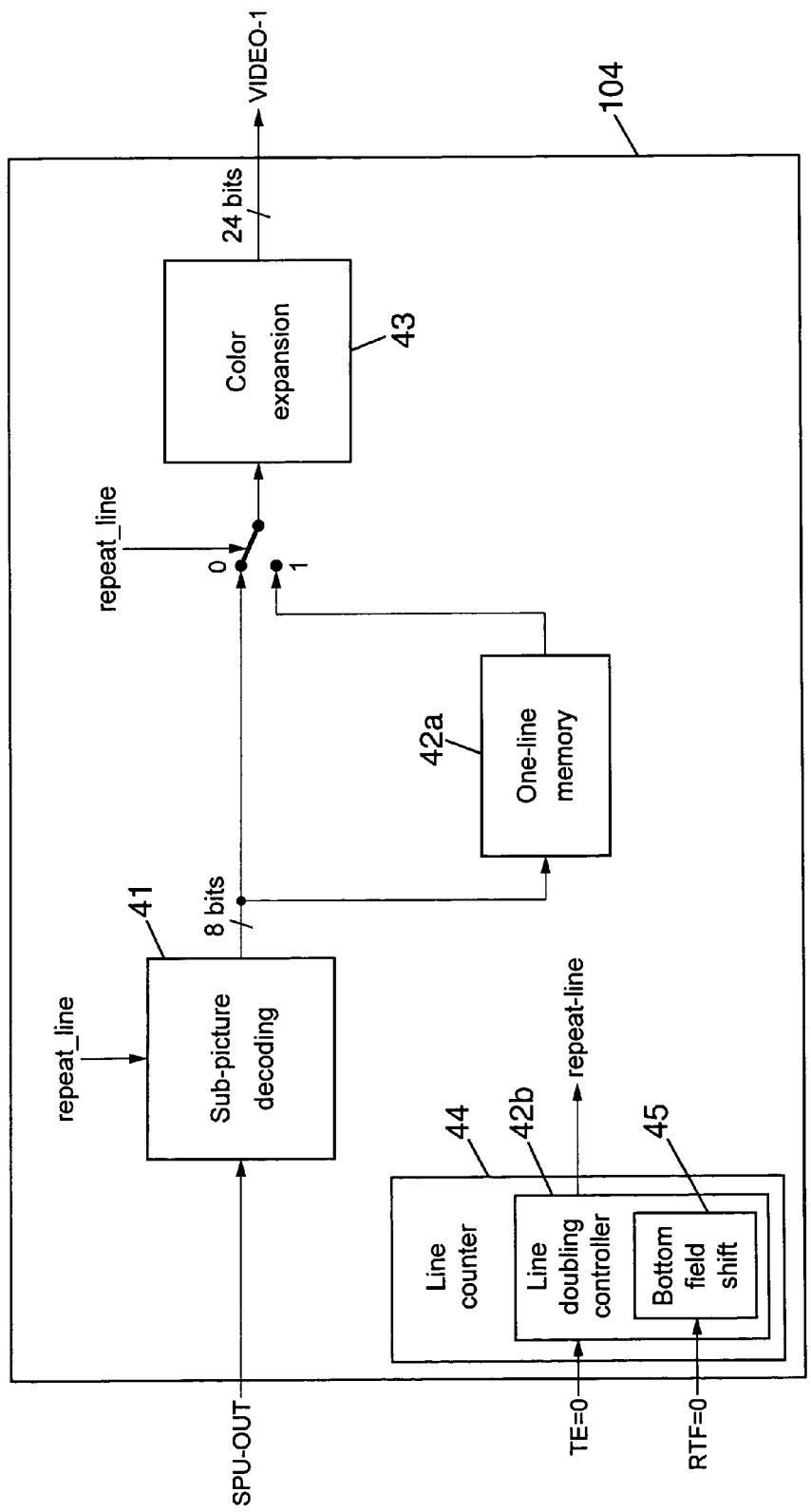
FIG. 16 is a block diagram illustrating hardware elements of a sub-picture decoder of the system of FIG. 15 according to one embodiment of the present invention.

FIG. 16 depicts a detailed block diagram of main hardware of means 104 of decoder 102. The hardware comprises a first sub-picture decoding stage 41, a Line Doubling module 42a, 42b as well as a Bottom Field Shift module 45, a last sub-picture decoding stage 43, and a line counter 44.

Stage 41 carries out sub-picture decoding except for the final step of color expansion, which color expansion is carried out by stage 43. Stage 43 comprises a Look-up Table (LUT) which delivers as output 24-bits pixels values based on 8-bits pixels values received as input.

The counter 44 is capable of counting up to 2×N, where N is the number of lines in one field. Indeed, for progressive display, the line counter 44 has to count twice more lines than for interlaced display.

The Line Doubling module comprises a delay line 42a having a one-line memory (i.e., with 720×8 bits of storage capacity), in order to store a whole line to be displayed twice, and a Line Doubling controller 42b which is embodied in counter 44. Bottom Field Shift module 45 is embodied in the Line Doubling controller 42b.

It shall be observed that delay line 42a is inserted in the decoding chain before stage 43 which is used for carrying out the LUT-based decompression process, whereby the quantity of information to be stored is minimized: 8 bits per pixel instead of 24 bits per pixel if the delay line was inserted after stage 43. This is possible because the same parameters used for the LUT-based decompression process are applied to the entire field.

The operation of the decoder is the following. Each decoded lines are stored into the one-line memory 42a. The Line Doubling controller is activated when bit TE is 0 (TE=0), which means that Field-to-Frame transcoding is not possible. The decoder then enters the Line Doubling mode. The line counter 44 provides a repeat_line bit which toggles at the line rate to select one line out of the line being decoded and the line previously decoded; and stored in memory 42*a*. When the line previously stored is displayed (that is to say when repeat_line bit is set at 1), the stage 41 of the sub-picture decoder is disabled and no compressed data are fetched from SPU_OUT.

The line counter 44 is also handling the "Line Doubling with Bottom Field Shift" mode. This is simply done by adding an offset of one line during the line doubling of the bottom field. To this end, Bottom Field Shift device 45 is activated when bit RTF is 0 (RTF=0), which means that SPU contains both top and bottom fields. Accordingly top field is first displayed in Line Doubling mode and bottom field is then displayed in Line Doubling with Bottom Field Shift mode. It shall be observed that Bottom Field Shift module 45 might be activated only when the Line Doubling controller is activated, that is when both bit TE and bit RTF are 0 (TE=RTF=0).

When bit TE is 1, which means that Field-to-Frame transcoding is carried out, the bit repeat_line is set to 0 and the decoder operates out of the Line Doubling mode.

From the foregoing it will be appreciated that, although specific exemplary embodiments of the invention have been described herein for purposes of illustration, various changes and modifications may be made or suggested to one skilled in the art without deviating from the scope of the invention. Accordingly, the invention is not limited except as by the appended claims. It is intended that the present invention encompass such changes and modifications as fall within the scope of the appended claims.

What is claimed is:

1. A method of transcoding a sub-picture unit comprising encoded sub-picture pixel data and a set of display control commands associated with the sub-picture pixel data, comprising the steps of:
   receiving, in a hardware video processing system, a first sub-picture unit wherein the encoded sub-picture pixel data comprises sub-picture lines separated into a first field and a second field;
   pre-processing one or more of said display control commands by the video processing system;
   interleaving said encoded lines of said first and second fields into a single encoded frame according to the pre-processed display control commands;
   modifying said display control commands according to changes in encoded sub-picture pixel data; and
   outputting a second sub-picture unit comprising said interleaved sub-picture pixel data and said modified display control commands.

2. The method according to claim 1, wherein interleaving includes copying encoded lines of said first and second fields one after another.

3. The method according to claim 2, wherein the step of interleaving interleaves blocks defined by first and second fields start position, width and height.

4. The method of claim 1, further comprising the step of:
   determining whether sufficient CPU power is available for transcoding the sub-picture unit, wherein
   the steps of interleaving and modifying are performed only if the step of determining determines that sufficient CPU power is available for transcoding the sub-picture unit, and
   the step of outputting outputs the second sub-picture unit or the first sub-picture unit, respectively, according to whether sufficient CPU power is available for transcoding the sub-picture unit is available or is not available.

5. The method according to claim 3, further comprising the step of:
   determining whether the sub-picture unit comprises only one of the first and second fields, and
   signaling the result of the step of determining.

6. The method of claim 1, wherein
   the step of preprocessing comprises the step of determining whether transcoding of the sub-picture unit can be performed,
   the steps of interleaving and modifying are performed only if the step of determining determines that transcoding of the sub-picture unit can be performed, and
   outputting outputs the second sub-picture unit or the first sub-picture unit, respectively, according to whether transcoding of the sub-picture unit can be performed or cannot be performed.

7. The method according to claim 4, further comprising the step of signaling the format, unmodified or transcoded, of the sub-picture unit which is outputted.

8. An apparatus for transcoding a sub-picture unit comprising encoded sub-picture pixel data and a set of display control commands associated with the sub-picture pixel data, comprising:
   an input configured to receive a first sub-picture unit, wherein the encoded sub-picture pixel data comprises sub-picture lines separated into a first field and a second field;
   a parser coupled to the input and configured to preprocess one or more of the set of display control commands and produce the preprocessed data control commands at an output;
   a pixel data converter coupled to the input and to the output of the parser and configured to interleave the encoded lines of the first and second fields into a single encoded frame according to the preprocessed display control commands and produce the interleaved sub-picture pixel data at an output;
   a display control command converter coupled to the input and to the output of the parser and configured to modify the set of display control commands according to the interleaved sub-picture pixel data and produce the modified set of display commands at an output; and
   a first output, coupled to the output of the pixel data converter and the output of the display control command converter, configured to produce a second sub-picture unit comprising the interleaved sub-picture pixel data and the modified set of display control commands.

9. The apparatus of claim 8, wherein the pixel data converter interleaves encoded lines of said first and second fields one after another.

10. The apparatus of claim 9, wherein the pixel data converter interleaves blocks of encoded sub-picture pixel data defined by first and second field start position, width and height.

11. The apparatus of claim 8, further comprising:
    a switch coupled to the input and the first output and operable to connect the input to the first output upon a determination by the parser that transcoding of the sub-picture unit cannot be performed, whereby the pixel data converter and the display control command converter are bypassed and the first sub-picture unit is produced at the first output.

12. The apparatus of claim 8, further comprising:
    a bandwidth estimator, coupled to the input, configured to determine whether sufficient CPU power is available for transcoding the sub-picture unit; and
    a switch coupled to the input and the first output and operable to connect the input to the first output upon a determination by the bandwidth estimator that sufficient CPU power is not available for transcoding the sub-picture unit, whereby the pixel data converter and the display control command converter are bypassed and the first sub-picture unit is produced at the first output.

13. The apparatus of claim 12, further comprising a second output configured to indicate whether the sub-picture unit at the first output is the first sub-picture unit or second sub-picture unit.

14. The apparatus of claim 8, further comprising a second output configured to indicate whether the parser has determined that the encoded sub-picture pixel data of the sub-picture unit comprises only one of the first and second fields.

15. A video display system, comprising:
a source of data;
a stream of sub-picture units, each sub-picture unit comprising encoded sub-picture pixel data and a set of display control commands associated with the sub-picture pixel data;
a stream of video/audio data;
a transcoder coupled to the source of data;
a stream input configured to receive the stream of sub-picture units, wherein the encoded sub-picture pixel data of at least one input sub-picture unit comprises sub-picture lines separated into a first field and a second field;
a parser coupled to the stream input and configured to preprocess one or more of the set of display control commands of at least one input sub-picture unit and produce the preprocessed data control commands at an output;
a pixel data converter coupled to the stream input and to the output of the parser and configured to interleave the encoded lines of the first and second fields of at least one input sub-picture unit into a single encoded frame according to the preprocessed display control commands and produce the interleaved sub-picture pixel data at an output;
a display control command converter coupled to the stream input and to the output of the parser and configured to modify the set of display control commands of at least one input sub-picture unit according to the interleaved sub-picture pixel data and produces the modified set of display commands at an output;
a first output, coupled to the output of the pixel data converter and the output of the display control command converter, configured to produce a second stream of sub-picture units comprising the interleaved sub-picture pixel data and the modified set of display control commands of at least one input sub-picture unit;
a sub-picture decoder coupled to the first output of the transcoder configured to decode and display the encoded sub-picture pixel data of the second stream of sub-picture units according to the corresponding display control commands and produces a sub-picture video signal at an output;
a video/audio decoder coupled to the source configured to receive the stream of video/audio data, decodes the video/audio data, produce an audio signal at an audio output of the video display system, and produce a video signal at a video output of the video/audio decoder; and
a video mixer coupled to the video output of the video/audio decoder and to the output of the sub-picture decoder configured to merge the video signal and the sub-picture video signal and produce the merged video signal at a video output of the video display system.

16. The video display system of claim 15, wherein
the transcoder does not modify sub-picture units having sub-picture pixel data with only a single field of lines,
the transcoder further comprises a second output configured to indicate for each sub-picture unit in the second stream of sub-picture units whether the sub-picture unit has been modified by the transcoder, and
the sub-picture decoder is further coupled to the second output of the transcoder and is configured to display an unmodified sub-picture unit by displaying each line of the sub-picture pixel data twice.

17. The video display system of claim 16, wherein
the transcoder further comprises a third output configured to indicate for each sub-picture unit in the second stream of sub-picture units whether the sub-picture unit has only a bottom field of lines, and
the sub-picture decoder is further coupled to the third output of the transcoder and is configured to display a sub-picture unit having only a bottom field of lines by displaying the lines of the sub-picture pixel data with a one line shift.

18. The video display system of claim 15, wherein
the transcoder does not modify sub-picture units for which the transcoder determines that transcoding of the sub-picture unit cannot be performed,
the transcoder further comprises a second output configured to indicate for each sub-picture unit in the second stream of sub-picture units whether the sub-picture unit has been modified by the transcoder, and
the sub-picture decoder is further coupled to the second output of the transcoder and is configured to display an unmodified sub-picture unit by displaying each line of the sub-picture pixel data twice.

19. The video display system of claim 18, wherein
the transcoder further comprises a third output configured to indicate for each sub-picture unit in the second stream of sub-picture units whether the sub-picture unit has only a bottom field of lines, and
the sub-picture decoder is further coupled to the third output of the transcoder and is configured to display a sub-picture unit having only a bottom field of lines by displaying the lines of the sub-picture pixel data with a one line shift.

20. The video display system of claim 15, wherein the transcoder further comprises:
a bandwidth estimator coupled to the stream input configured to determine for at least one input sub-picture unit whether sufficient CPU power is available for transcoding the sub-picture unit and the transcoder does not modify sub-picture units for which the bandwidth estimator determines that sufficient CPU power is not available for transcoding the sub-picture unit; and
a second output configured to indicate for each sub-picture unit in the second stream of sub-picture units whether the sub-picture unit has been modified by the transcoder,
wherein the sub-picture decoder is further coupled to the second output of the transcoder and is configured to display an unmodified sub-picture unit by displaying each line of the sub-picture pixel data twice.

21. The video display system of claim 15, wherein the transcoder is embodied in one or more programs stored on one or more computer readable mediums for a digital processor.

* * * * *